(12) United States Patent
Ko et al.

(10) Patent No.: US 6,465,271 B1
(45) Date of Patent: Oct. 15, 2002

(54) METHOD OF FABRICATING SILICON CAPACITIVE SENSOR

(76) Inventors: Wen H. Ko, 1356 Forest Hills Blvd., Cleveland Heights, OH (US) 44118; Qiang Wang, 2709 Somerset Park Cir., San Jose, CA (US) 95132

(*) Notice: Subject to any disclaimer, the term of this patent is extended or adjusted under 35 U.S.C. 154(b) by 0 days.

(21) Appl. No.: 09/743,432

(22) PCT Filed: Jul. 7, 1999

(86) PCT No.: PCT/US99/16140

§ 371 (c)(1),
(2), (4) Date: Jan. 5, 2001

(87) PCT Pub. No.: WO00/02028

PCT Pub. Date: Jan. 13, 2000

Related U.S. Application Data
(60) Provisional application No. 60/091,909, filed on Jul. 7, 1998.

(51) Int. Cl.[7] .................. H01L 21/301; H01L 21/00; G01L 9/12
(52) U.S. Cl. ................ 438/48; 438/53; 361/283.4; 73/724
(58) Field of Search .............. 73/718, 724, 754; 361/283.4, 283.1; 438/48, 50, 53, 455, 456, 459, 462, 460, 977

(56) References Cited

U.S. PATENT DOCUMENTS

| | | | | |
|---|---|---|---|---|
| 3,288,656 | A | * | 11/1966 | Nakamura |
| 3,993,939 | A | * | 11/1976 | Slavin et al. |
| 4,104,595 | A | * | 8/1978 | Overzet |
| 4,392,382 | A | * | 7/1983 | Myers |
| 4,446,447 | A | * | 5/1984 | McNamara |
| 4,820,971 | A | * | 4/1989 | Ko et al. |
| 5,453,628 | A | * | 9/1995 | Hartell et al. ............. 257/76 |
| 5,528,452 | A | * | 6/1996 | Ko |
| 5,546,070 | A | * | 8/1996 | Ellman et al. |
| 5,596,144 | A | * | 1/1997 | Swanson ................. 73/514 |
| 5,656,781 | A | * | 8/1997 | Kankkunen |
| 5,683,594 | A | * | 11/1997 | Hocker et al. .......... 216/33 |

(List continued on next page.)

OTHER PUBLICATIONS

Maszara et al. Bonding of Silicon Wafers for Silicon–on–Insulator J. Appl. Phys. vol. 64 (10) Nov. 15, 1988 pp. 4943–4950.

(List continued on next page.)

*Primary Examiner*—Savitri Mulpuri

(57) ABSTRACT

Manufacturing all-silicon force sensors, such as capacitive pressure sensors (100, 200) that have long term stability and good linear sensitivity, and can be built into of a pneumatic tire. The sensors include buried electrical feedthrough (112b) to provide an electrical connection into a sealed silicon cavity (108). The buried feedthrough consists of a conductor (112b) in a shallow groove (106) in a substrate (102), communicating between the sensing cavity (108) and an external contact area (110). The sensor designs also feature a method for forming a silicon-to-silicon fusion bond (SFB) wherein at least one of the two surfaces (152, 252) to be has a tough silicon surface unsuitable for good SFB joints because it was bonded heavily boron-doped by means of diffusion. The method of this invention includes preparing each doped surface (152, 252) for SFB by polishing the surface with a Chemical-Mechanical Polishing (CMP) process. The sensor designs can also include optional reference capacitors (141, 241) on the same chip (100, 200) as the sensing capacitor (140, 240). The reference capacitors (141, 241) are insensitive to pressure (force), but respond to ambient temperature changes in the same way as the sensing capacitor. Suitable external interface circuits can utilize the reference capacitors (141, 241) to pull out the majority of ambient temperature effects.

19 Claims, 5 Drawing Sheets

U.S. PATENT DOCUMENTS

| | | | | |
|---|---|---|---|---|
| 5,706,565 | A | * | 1/1998 | Sparks et al. |
| 5,721,162 | A | * | 2/1998 | Schubert et al. ............... 438/52 |
| 5,736,430 | A | * | 4/1998 | Seeefeldt et al. ............. 438/53 |
| 5,895,233 | A | * | 4/1999 | Higashi et al. ............. 438/107 |
| 5,932,809 | A | * | 8/1999 | Sparks et al. .................. 73/727 |
| 5,936,164 | A | * | 8/1999 | Sparks et al. .................. 73/718 |
| 6,074,891 | A | * | 1/2000 | Staller .......................... 438/53 |
| 6,109,113 | A | * | 8/2000 | Chavan et al. ................. 73/718 |
| 6,150,681 | A | * | 11/2000 | Allen ......................... 257/254 |
| 6,326,228 | B1 | * | 12/2001 | Hughes et al. ................ 438/49 |

OTHER PUBLICATIONS

Shimbo et al. Silicon–to–Silicon Direct Bonding Method J. Appl. Phys. vol. 60 (8) Oct. 15, 1986 pp. 2987–2991.

Jornod et al. High–Precision Capacitive Absolute Pressure Sensor Sensors and Actuators vol. 17 (1989) pp. 415–421.

Hanneborg et al. A Capacitive Pressure Sensor with Low TC0 and High Long–Term Stability Sensors and Actuators, A21–A23 (1990) pp. 151–154.

Peters et al. Ultra–Stable, High–Temperature Pressure Sensors Using Silicon Fusion Bonding Sensors and Actuators, A21–A23 (1990) pp. 96–101.

Steinmann et al. Mechanical Behaviour of Micromachined Sensor Membranes Under Uniform External Pressure Affected by In–Plane Stresses Using a Ritz Method and Hermite Polynomials Sensors and Actuators, A48 (1995) pp. 37–46.

Barth, Philip W. Silicon Fusion Bonding for Fabrication of Sensors, Actuators and Microstructures Sensors and Actuators, A21–A23 (1990) pp. 919–926.

Wang et al. Modeling of Touch Mode Capacitive Sensors and Diaphragms Sensors and Actuators, 2302 (1999).

Maseeh et al. Plastic Deformation of Highly Doped Silicon Sensors and Actuators, A21–A23 (1990) pp. 861–865.

Takagi et al. Surface Activated Bonding of Silicon Wafers at Room Temperature Appl Phys. Lett. vol. 68 (16) Apr. 15, 1996 pp. 2222–2224.

Bourouina et al. Variational Method for Tensile Stress Evaluation and Application to Heavily Boron–Doped Square–Shaped Silicon Diaphragms Sensors and Actuators, A49 (1995) pp. 21–27.

Ko et al. Touch Mode Capacitive Pressure Sensors Sensors and Actuators, 2303 (1999).

Ding et al. Touch Mode Silicon Capacitive Pressure Sensors 1990 ASME Winter Annual Meeting Nov. 25, 1990 pp. 111–117.

* cited by examiner

METHOD OF FABRICATING SILICON CAPACITIVE SENSOR

CROSS-REFERENCE TO RELATED APPLICATIONS

This application claims the benefit of commonly-owned, U.S. Provisional Patent Application No. 60/091,909, filed Jul. 7, 1998 by Ko et al.

Attention is directed to commonly-owned, copending PCT patent application Ser. No. PCT/US99/15270 entitled DUAL OUTPUT CAPACITANCE INTERFACE CIRCUIT filed on Jul. 7, 1999.

TECHNICAL FIELD OF THE INVENTION

The invention relates to pressure sensors and, more particularly, touch mode capacitive pressure sensors.

BACKGROUND OF THE INVENTION

In various industrial and commercial applications, it is desired to measure pressure in a hostile environment, with a miniaturized sensor having good stability, low power consumption, robust structure, large over pressure protection range, and good linearity and sensitivity. For example, such a sensor could be used in conjunction with an RF transponder disposed within a pneumatic tire as shown in commonly-owned, copending PCT patent application No. US98/07338 filed Apr. 14, 1998, incorporated in its entirety by reference herein. Applications such as the pneumatic tire place additional requirements on the pressure sensor due to the need for the sensor to withstand both the normal operating temperature and pressure ranges and also the much higher (many times the operating values) manufacturing temperature and pressure. For example, molding the sensor into a tire is but one illustration of an environment where conventional sensors fail to meet these desired criteria.

Capacitive pressure sensors are known, and can be designed to meet many if not all of the desired characteristics. Capacitive pressure sensors generally include two capacitive elements (plates, or electrodes), one of which is typically a thin diaphragm, and a gap between the electrodes. When a pressure is exerted on the diaphragm, the diaphragm deflects (deforms) and the size of the gap (in other words, the distance between the two capacitive elements) varies. And, as the gap varies, the capacitance of the sensor varies. Such changes in capacitance can be manifested, by associated electronic circuitry, as an electronic signal having a characteristic, such as voltage or frequency, indicative of the pressure exerted upon the sensor.

In the "normal" operation mode of a capacitive pressure sensor, the diaphragm does not contact the fixed electrode. The output capacitance is nonlinear due to an inverse relationship between the capacitance and the gap which is a function of pressure P. This nonlinearity becomes significant for large deflections. Many efforts have been made to reduce the nonlinear characteristics of capacitive sensors either by modifying the structure of the sensors or by using special non-linear converter circuits.

Particularly advantageous for the achievement of linearity has been the development of "touch mode capacitive pressure sensors" (TMCPS). A particular class of capacitive pressure sensors operate in what is known as "touch mode". Touch mode sensors have been disclosed, for example, in Ding, et al., *Touch Mode Silicon Capacitive Pressure Sensors*, 1990 ASME Winter Annual Meeting, Nov. 25, 1990, incorporated in its entirety by reference herein. They are further explained in Ko and Wang, *Touch Mode Capacitive Pressure Sensors*, Sensors and Actuators 2303 (1999), also incorporated in its entirety by reference herein.

Conventional capacitive pressure sensors normally operate in a pressure range where the diaphragm is kept from contacting the underlying electrode, and normally exhibit nonlinear characteristics. This inherent non-linearity has led to the development of many linearization schemes using complex and costly interface circuits which include analog circuits and amplifiers, segment linearization, microprocessor and ROM matrix linearization, etc.

In contrast thereto, touch mode capacitive pressure sensors, operating in the range where the diaphragm touches the insulating layer on the underlying electrode, exhibit near linear behavior in certain pressure ranges. The increased linearity is attributable to the touched area (footprint) increasing linearly with applied pressure and the increased rigidity of the diaphragm after touch.

Furthermore, the touch mode capacitive pressure sensor has much higher sensitivity (large capacitance change per unit pressure change) compared to conventional capacitive pressure sensors. Therefore, small environmentally-caused capacitance changes over time become insignificant and can be neglected. This makes the touch mode device a long term stable device over a wide range of environmental conditions.

These advantages are inherent with touch mode capacitive devices, no matter what materials are used for the diaphragm and the substrate.

Generally, touch mode capacitive pressure sensors differ from conventional capacitive pressure sensors (described hereinabove) in that the diaphragm element is permitted to deflect sufficiently to come into actual physical contact with the underlying fixed capacitive element at a given pressure. Typically, a thin dielectric insulating layer on the fixed capacitive element prevents the diaphragm from electrically shorting to the fixed capacitive element. As the pressure increases, the "footprint" of the diaphragm upon the fixed capacitive element increases, thereby altering the capacitance of the sensor, which can be manifested, by associated electronic circuitry, as an electronic signal having a characteristic indicative of the pressure exerted upon the sensor. The major component of the touch mode sensor capacitance is that of the touched area footprint where the effective gap is the thickness of the thin insulator layer between the pressed-together capacitive elements. Because of the small thickness and large dielectric constant of the isolation layer, the capacitance per unit area is much larger than that of the untouched area which still has an added air or vacuum gap. In a certain pressure range, the touched area is nearly proportional to the applied pressure, and results in the nearly linear C-P (capacitance-pressure) characteristics of the touch mode pressure sensor. For the range of pressures in the touch mode operation region, the sensor capacitance varies with pressure nearly linearly and the sensitivity (dC/dP) is much larger than that in the near linear region of a normal mode device. In addition to high sensitivity and good linearity, the fixed element substrate provides support to the diaphragm after it touches, thus enabling the device to have significant pressure over-load protection. In summary, the advantages of TMCPS are nearly linear C-P characteristics, large over-load protection, high sensitivity and simple robust structure that can withstand industrial handling and harsh environments.

As used herein, a "touch mode" capacitive pressure sensor includes any capacitive pressure sensor wherein at least a portion of the operating range of the pressure sensor occurs while the diaphragm is in physical contact with the underlying capacitive element.

An early example of a capacitive touch mode pressure sensor is shown in U.S. Pat. No. 3,993,939, entitled PRESSURE VARIABLE CAPACITOR, incorporated in its entirety by reference herein. This patent discloses a large scale version of TMCPS with a variety of diaphragm constructions.

Some of the more recent efforts have focused on miniaturization, cost reduction, and performance improvements. An example is shown in U.S. Pat. No. 5,528,452, entitled CAPACITIVE ABSOLUTE PRESSURE SENSOR, incorporated in its entirety by reference herein. This patent discloses a sensor comprising a substrate having an electrode deposited thereon and a diaphragm assembly disposed on the substrate.

The TMCPS diaphragm can be made of different materials, such as silicon, poly-silicon, silicon nitride, polymeric materials, metal, and metallized ceramic. Each material choice has its advantages and disadvantages. For good stability, robust structure, and avoidance of temperature and pressure related problems, the use of single crystal silicon is preferred, because it has well characterized, well understood, reliable and reproducible electrical and mechanical properties. The aforementioned U.S. Pat. No. 5,528,452 discloses a preferred embodiment with a single crystal silicon diaphragm, which is electrostatically bonded (anodic bonding) to a glass substrate. Although this provides a simple construction which avoids prior art problems with sealing of the vacuum chamber contained between the capacitive elements, it still requires special techniques to fill the gap around the electrical feedthrough from the fixed electrode inside the vacuum chamber to the external electrical connection. The fixed electrode and the connected feedthrough consist of a thin layer of metal deposited on the surface of the glass substrate, covered by an insulating layer. The feedthrough creates a raised line which must pass under the sealing edge of the silicon diaphragm assembly. In order to seal around the feedthrough, a groove is cut in the sealing edge of the silicon diaphragm assembly. With proper shaping of the feedthrough and groove, and with proper alignment, a suitable heat treatment will cause the glass insulating layer to deform and seal the space around the feedthrough in the diaphragm assembly groove.

All-silicon capacitive pressure sensors are characterized by high pressure sensitivity, low mechanical interference and low temperature sensitivity. They can operate up to a temperature of about 300° C., and remain almost free of hysteresis.

Drift exhibited by silicon-to-glass capacitive pressure sensors is believed to be caused by mismatch between the thermal expansion coefficients of the glass and the silicon, and the stress built during fabrication. Other problems can arise under temperature extremes which may cause the glass or glass frit to outgas. Using silicon-to-silicon fusion bonding technology, a single crystal capacitive pressure sensor can be realized. For silicon-to-silicon bonded structures, both wafers have the same thermal expansion coefficients, and a better thermal stability is expected than with the silicon-to-glass structure. Using the silicon fusion bonding method, an ultra-stable, high temperature, capacitive pressure sensor can be made.

Silicon fusion bonding is a known technique for bonding together silicon components, either directly silicon-to-silicon, or via an intermediary silicon oxide layer. The latter technique is disclosed, for example, in U.S. Pat. No. 3,288,656, entitles SEMICONDUCTOR DEVICE, incorporated in its entirety by reference herein. A limitation of this technique is that the surfaces to be bonded must be microscopically smooth in order to achieve the intimate contact needed to form good silicon-to-silicon or silicon-to-silicon oxide fusion bonds.

An example of a capacitive pressure sensor with an all-silicon vacuum chamber fabricated using silicon fusion bonding can be seen in U.S. Pat. No. 5,656,781, entitled CAPACITIVE PRESSURE TRANSDUCER STRUCTURE WITH A SEALED VACUUM CHAMBER FORMED BY TWO BONDED SILICON WAFERS, incorporated in its entirety by reference herein. This sensor avoids the problems of sealing around a feedthrough by placing the fixed electrode on a substrate adjacent to the silicon diaphragm but outside the silicon vacuum chamber. As such, the sensor cannot function in a touch mode since ambient pressure deflects the diaphragm away from the fixed electrode.

Another example of an all-silicon, touch mode capacitive pressure sensor is shown in U.S. Pat. No. 5,706,565, entitled METHOD FOR MAKING AN ALL-SILICON CAPACITIVE PRESSURE SENSOR, incorporated in its entirety by reference herein. This patent discloses a sensor with a vacuum chamber formed as a cavity etched into a single crystal silicon wafer doped to be conductive, has an insulating oxide layer on top of the wafer, and a conductive heavily-doped (P+) single crystal silicon diaphragm which is bonded on top of the oxide layer. Among the problems inherent in this design are the expense of a relatively complicated process and "stray capacitance" effects. The patent refers to "conventional wafer-to-wafer bonding techniques" for bonding the diaphragm to the substrate. The conventional wafer-to-wafer bonding technique known to those practiced in the art is silicon fusion bonding, which requires microscopically smooth bonding surfaces, as mentioned hereinabove. In order to achieve such a smooth surface on a heavily doped silicon wafer, the conventional technique uses ion bombardment for the P+ doping, rather than diffusion, because the diffusion process roughens the silicon wafer surface. Unfortunately, ion bombardment doping is much more time consuming, and therefore more expensive, than diffusion doping.

The term "stray capacitance" refers to capacitance other than the pressure-sensing capacitance, occurring elsewhere in the sensor or its measuring circuit. In the device of the U.S. Pat. No. 5,706,565 mentioned hereinabove, the sensing capacitance occurs between the conductive diaphragm and the fixed electrode (the conductive substrate at the bottom of the cavity), which are separated by a thin dielectric layer. The conductive silicon diaphragm is bonded to an insulating oxide layer on top of the conductive silicon substrate and this forms a second capacitor in parallel with the sensing capacitor. The second capacitor provides stray capacitance with a value which is mainly determined by the oxide layer characteristics and by the total area of contact between the diaphragm and the oxide layer. In order to achieve a good bond, this surface area is typically large enough to produce stray capacitance values more than an order of magnitude larger than the pressure sensing capacitance values.

Problems with capacitive pressure sensors can arise when the sensor must operate over a wide range of temperatures and over a wide range of pressures. Moreover, in some instances, it is essential that the pressure sensor simply survive temporary extremely hostile temperatures and/or pressures, even though it is not operating. For example, molding a pressure sensor into a tire during the fabrication of the tire is an example of a situation where the pressure sensor must survive extremely hostile ambient conditions.

An absolute pressure sensor should also preferably be stable, and free from base line drift problems, both short term and long term. These characteristics are particularly important for applications such as sensors disposed inside tires, where ambient conditions vary significantly and access for maintenance and calibration is limited and relatively costly.

OBJECTS OF THE INVENTION

It is an object of this invention to provide a force sensor and a manufacturing method for a force sensor (such as a capacitive pressure sensor) as defined in one or more of the appended claims and, as such, having the capability of being constructed and manufactured to accomplish one or more of the following subsidiary objects.

It is an object of this invention to provide a force sensor and a manufacturing method for a force sensor (such as a capacitive pressure sensor) which has long term stability, and good linear sensitivity, even in harsh environments, both in operation and in OEM application of the sensor in manufactured goods, e.g., such as building the sensor into the rubber of a pneumatic tire, and utilizing the sensor during operation of the tire.

It is an object that the sensor be rugged enough to survive and operate accurately and reliably in these harsh conditions.

It is a further object of this invention to provide a force sensor and a manufacturing method for a force sensor (such as a capacitive pressure sensor) which maintains a hermetic seal in the sensing cavity, while providing an isolated, buried electrical feedthrough to the fixed electrode in the sensing cavity.

It is a further object of this invention to provide a force sensor and a manufacturing method for a force sensor (such as a capacitive pressure sensor made with a silicon substrate and diaphragm) which is cost reduced by providing a means for silicon fusion bonding two silicon wafer surfaces, at least one of which is heavily doped by diffusion.

It is a further object of this invention to provide a force sensor and a manufacturing method for a force sensor (such as a capacitive pressure sensor made with a silicon substrate and diaphragm) which improves sensor stability and accuracy by minimizing stray capacitance effects, and by providing a way for interface circuits to utilize an on-chip reference capacitor to minimize ambient temperature effects on sensor sensitivity.

SUMMARY OF THE INVENTION

According to the invention, a first method of fabricating silicon capacitive sensors, comprises providing a first silicon wafer and a second silicon wafer; etching a buried electrical feedthrough groove in the first silicon wafer; etching a sensing cavity and a contact cavity, each cavity connected to an opposing end of the groove; forming a continuous and connected conductive area in the bottoms of the groove and the cavities; forming a P+ conductive diaphragm layer on the second silicon wafer by means of diffusion doping, then preparing the surface of the diaphragm layer for bonding by polishing with a chemical-mechanical polishing (CMP) process; then bonding the first and second wafers together using a silicon fusion bonding (SFB) technique; dissolving the second silicon wafer except for the diaphragm; etching open a window through the diaphragm layer to the fixed electrode contact cavity on the first silicon wafer; and finally dicing the plurality of sensors formed by this process.

As an optional extra step, the first process can include a step of forming an oxide layer over the conductive area in the bottom of the sensing cavity, thereby forming a dielectric layer to allow touch mode operation of the capacitive sensor formed by this method. In the same step, an insulating layer of oxide would also be formed over the conductive area in the bottom of the groove and extending into the sensing cavity to provide a continuous insulating layer over the conductive areas in the cavity and buried feedthrough groove.

Another optional step seals the buried feedthrough groove by depositing LTO (low temperature oxide) over the groove exit to the contact window. Doing this in a vacuum creates a vacuum reference chamber out of the sensing cavity, allowing the sensor to read absolute pressure. Leaving this step out would create a differential pressure sensor. After creating a LTO layer, windows must be opened above the electrical contacts, and optionally over the sensing diaphragm.

Another optional step provides a reference capacitor on the same chip, for reduced temperature sensitivity, by forming the reference capacitor using a conductive area near the surface of the substrate for a reference capacitor bottom electrode, establishing an electrical connection to a reference capacitor bottom electrode contact, using the oxide layer as a fixed-gap reference capacitor dielectric, and the top electrode is the diaphragm layer which will not move with pressure over the reference capacitor area because there is no cavity.

Another optional step provides better electrical connections to the chip by depositing a metal layer over the electrical contacts on the chip.

According to the invention, a second method (simplified from the first method) of fabricating silicon capacitive sensors, comprises providing a first silicon wafer and a second silicon wafer; preparing the first silicon wafer with a thick layer of oxide on one side, with the thickness determined by a designed gap of a sensing cavity; forming the sensing cavity by etching a designed cavity shape completely through the oxide layer; forming a P+ conductive diaphragm layer on the second silicon wafer by means of diffusion doping; then preparing the surface of the diaphragm layer by polishing with a chemical-mechanical polishing (CMP) process before bonding the first and second wafers together using a silicon fusion bonding (SFB) technique; dissolving the second silicon wafer except for the diaphragm layer; etching through the diaphragm layer, stopping at the underlying oxide layer to create a grove around the cavity and extending out to one side of the chip, so that the groove defines the extent of the sensing diaphragm (with a connecting path to a diaphragm contact area), and electrically isolates these areas from a remainder of the diaphragm layer; etching a window through the diaphragm layer and the oxide layer, stopping at the underlying first silicon wafer, to create a fixed electrode contact cavity; and finally dicing the plurality of sensors which are formed by this process.

As an optional extra step for the second method, the first process can include a step of forming an oxide layer over the conductive area in the bottom of the sensing cavity, thereby forming a dielectric layer to allow touch mode operation of the capacitive sensor formed by this method.

Another optional step in the second method uses the area covered by the remainder of the diaphragm layer (i.e., not over the sensing cavity) as an on-chip reference capacitor with the substrate as a bottom electrode (shared with the sensing capacitor), with the solid oxide layer as a fixed dielectric, and with the remainder of the diaphragm layer as a top electrode.

As in the first method, another optional step provides better electrical connections to the chip by depositing a metal layer over the electrical contacts on the chip.

Two techniques are features of the sensors and manufacturing methods of this invention.

The buried feedthrough technique utilized in the first method, described hereinabove, can be applied to any process needing to feed an electrical connection into a sealed silicon cavity. The buried feedthrough consists of a conductor in a shallow groove which is almost filled with an optional covering insulating oxide layer. The gap between the top of the insulator and the second silicon wafer which is bonded over the groove and cavity, can then be sealed with LTO.

The second special technique of this invention is a method for forming a silicon-to-silicon fusion bond (SFB) wherein at least one of the two surfaces to be bonded has been heavily boron-doped by means of diffusion, which is a less-costly way of doping, but creates a rough silicon surface unsuitable for good SFB joints. The technique is to prepare each doped surface for SFB by polishing the surface in a Chemical-Mechanical Polishing (CMP) process.

BRIEF DESCRIPTION OF THE DRAWINGS

Reference will be made in detail to preferred embodiments of the invention, examples of which are illustrated in the accompanying drawings (Figures). The drawings are intended to be illustrative, not limiting. Although the invention will be described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1A:
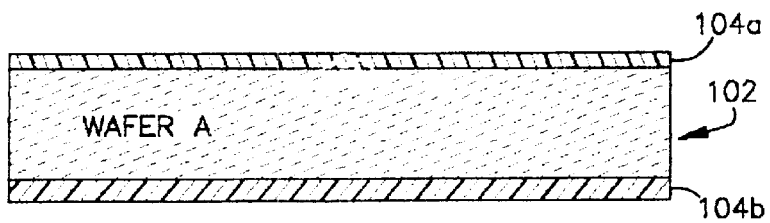

Elements of the figures are typically numbered as follows. The most significant digits (hundreds) of the reference number corresponds to the figure number. Elements of FIG. 1 are typically numbered in the range of 100–199. Elements of FIG. 2 are typically numbered in the range of 200–299. Similar elements throughout the drawings may be referred to by similra reference numerals. For example, the element 199 in a figure may be similar, and possibly identical to the element 299 in an other figure. In some cases, similar (including identical) elements may be referred to with similar numbers in a single drawing. For example, each of a plurality of elements 199 may be referred to individually as 199a, 199b, 199c, etc., and the complete set of elements 199a, 199b, 199c, etc. may be referred by the group reference 199. Such relationships, if any, between similar elements in the same or different figures will become apparent throughout the specification, including, if applicable, in the claims and abstract.

Figure 1B:
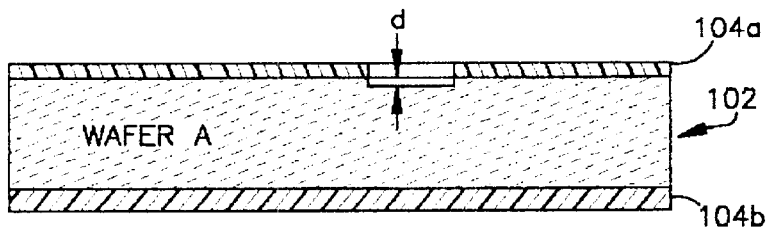
Figure 1C:
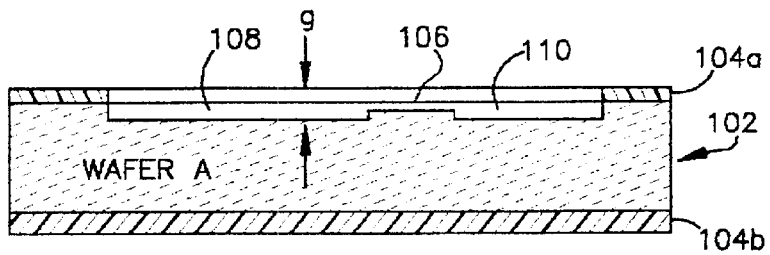
Figure 1D:
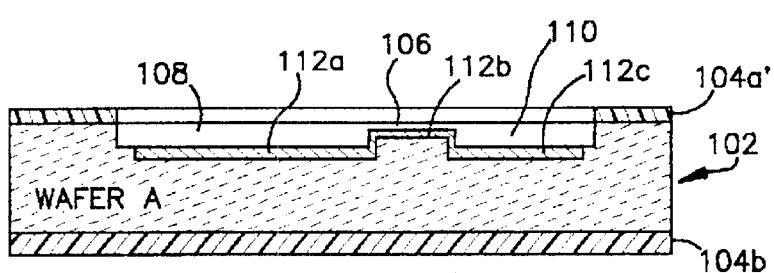
Figure 1E:
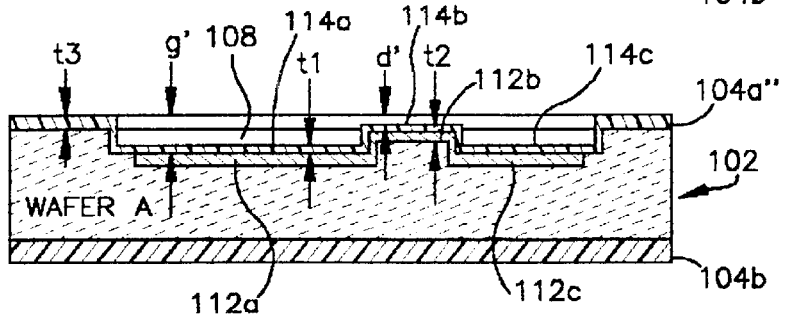
Figure 1F:
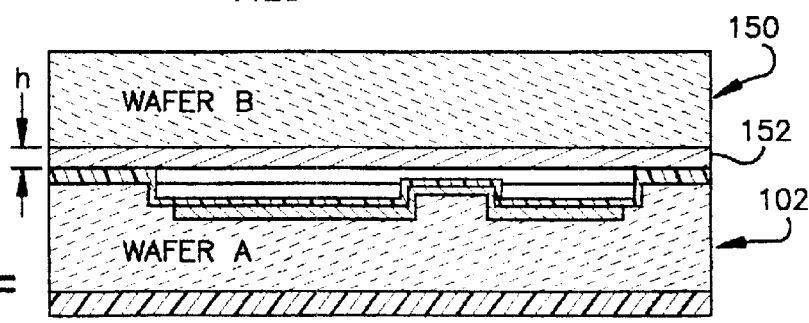
Figure 1G:
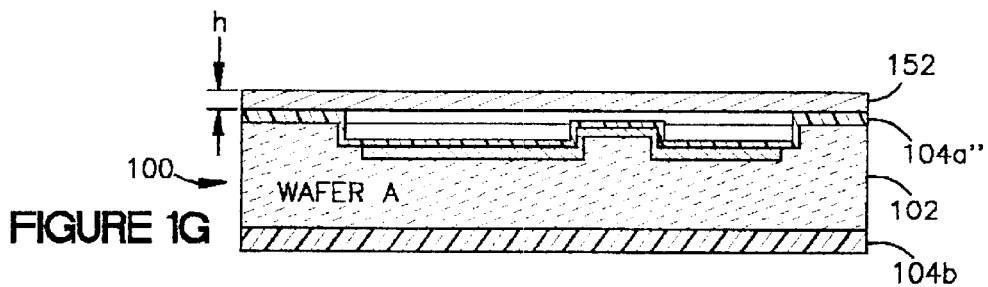
Figure 1H:
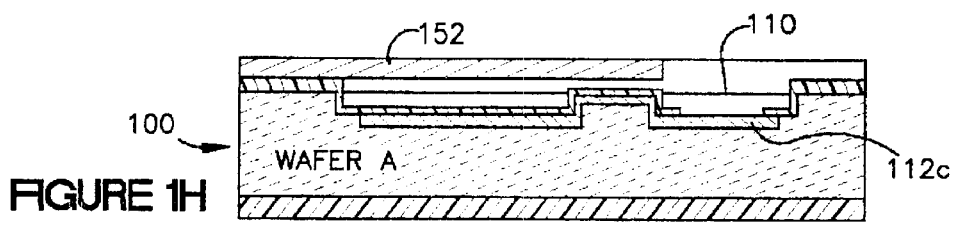
Figure 1I:
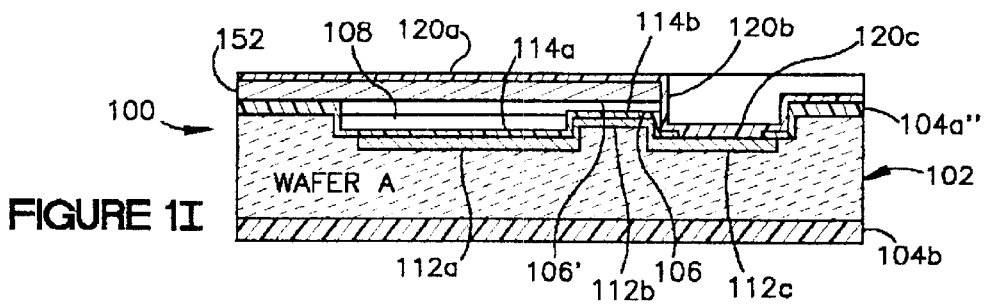
Figure 1J:
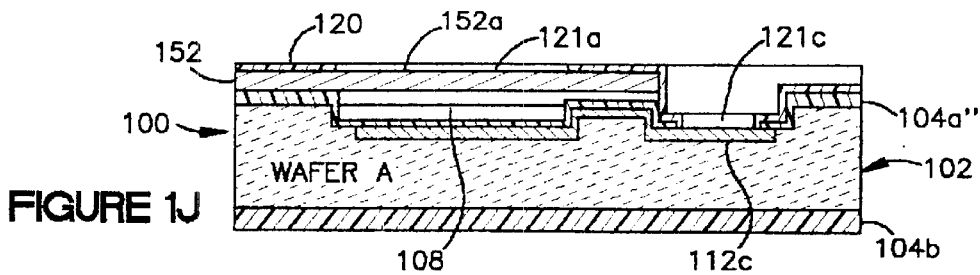
Figure 1K:
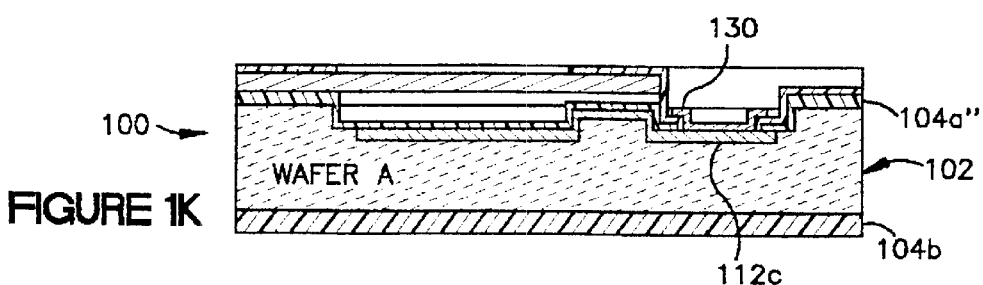
Figure 1L:
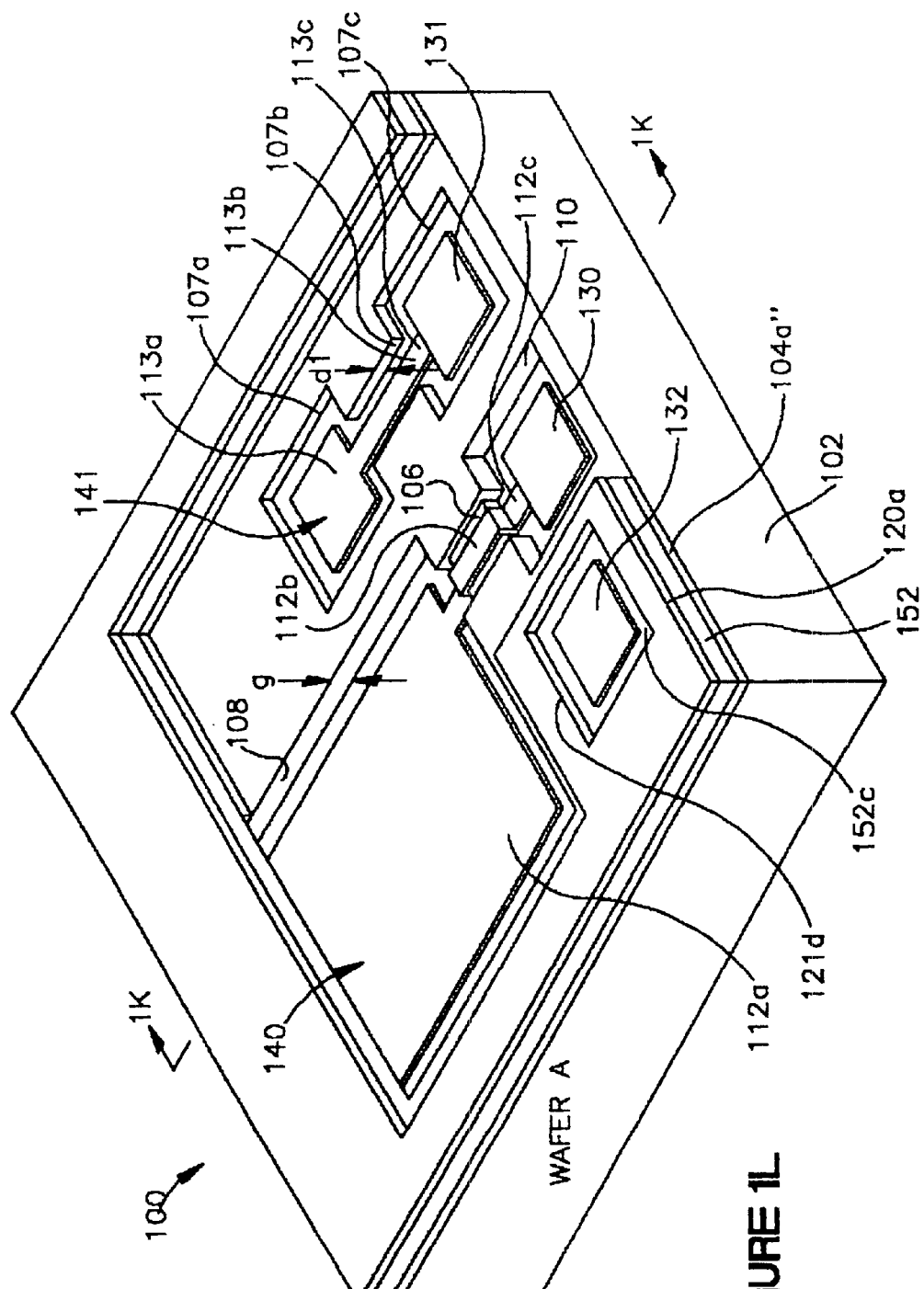
Figure 2A:
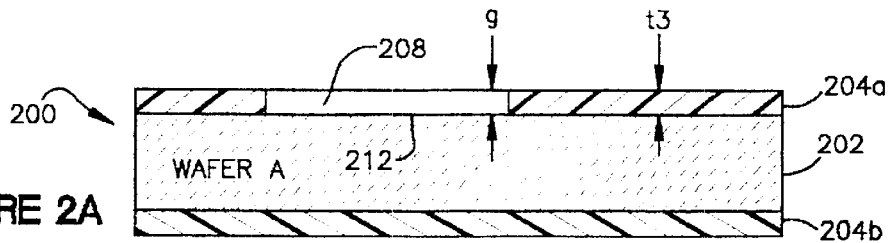
Figure 2B:
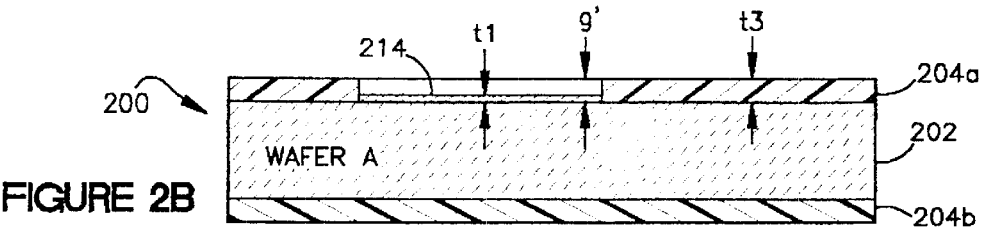
Figure 2C:
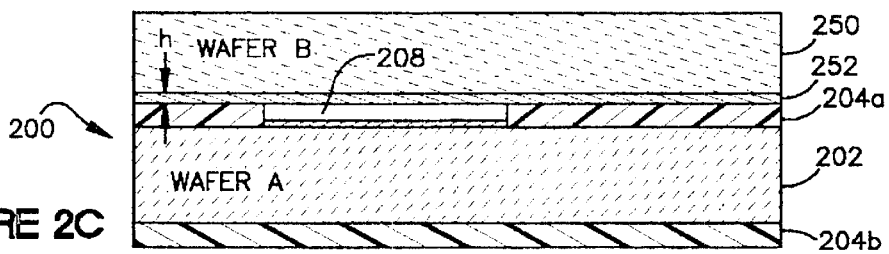
Figure 2D:
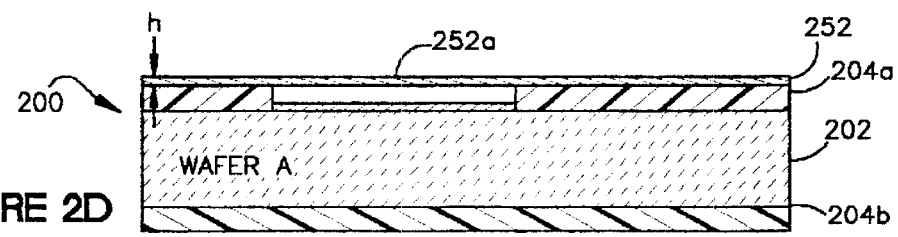
Figure 2E:
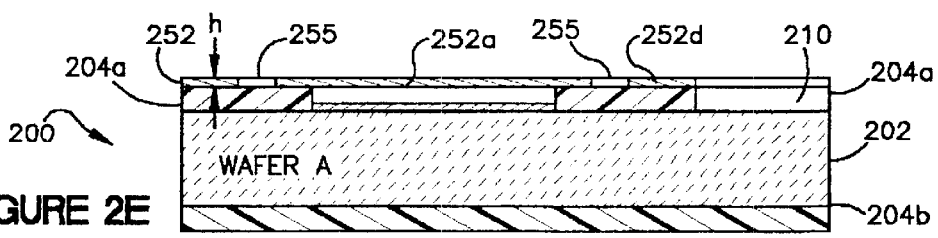
Figure 2F:
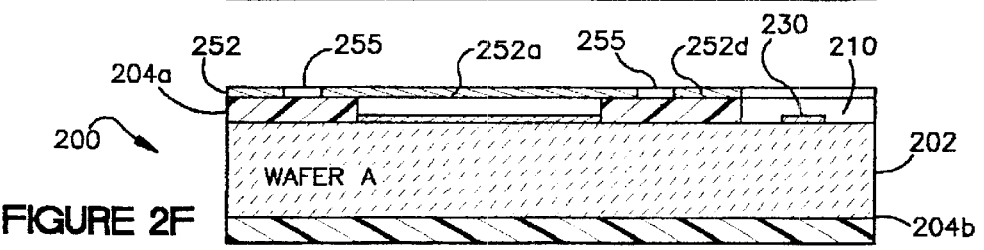
Figure 2G:
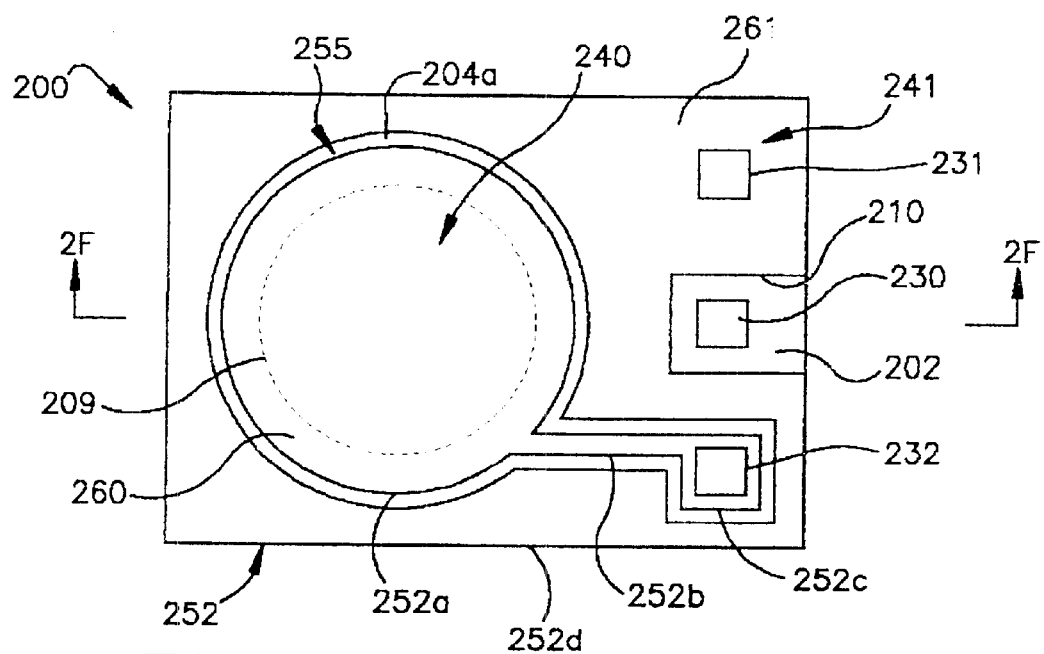
Figure 3:
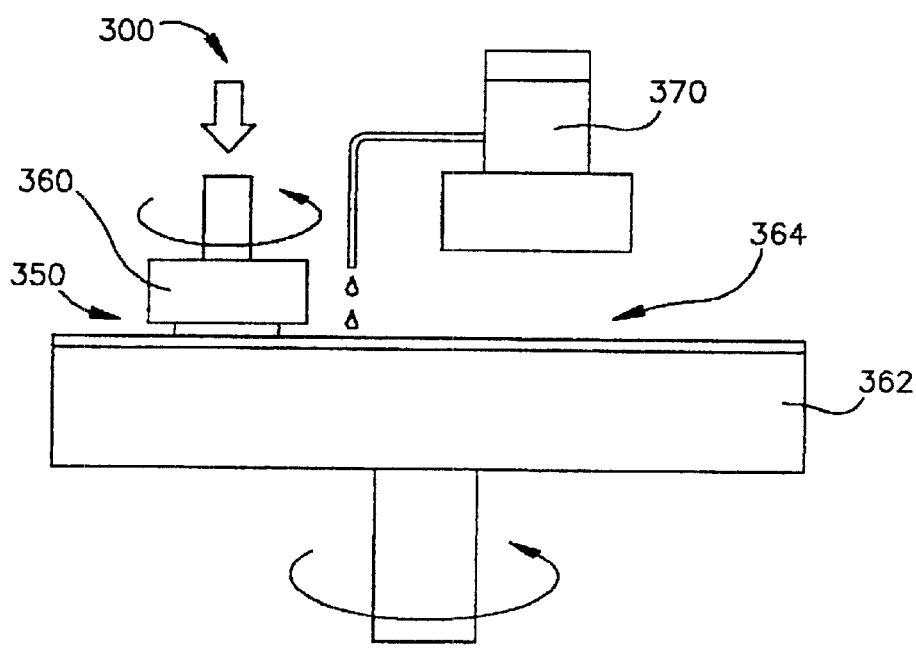

The structure, operation, and advantages of the present preferred embodiment of the invention will become further apparent upon consideration of the following description taken in conjunction with the accompanying drawings, wherein:

FIG. 1A is a side cross sectional view of a single chip portion of wafer A after Step 1 of the first SFB TMCPS manufacturing process, taken on a line 1K—1K through FIG. 1L, according to the invention;

FIG. 1B is a side cross sectional view of a single chip portion of wafer A after Step 2 of the first SFB TMCPS manufacturing process, taken on a line 1K—1K through FIG. 1L, according to the invention;

FIG. 1C is a side cross sectional view of a single chip portion of wafer A after Step 3 of the first SFB TMCPS manufacturing process, taken on a line 1K—1K through FIG. 1L, according to the invention;

FIG. 1D is a side cross sectional view of a single chip portion of wafer A after Step 4 of the first SFB TMCPS manufacturing process, taken on a line 1K—1K through FIG. 1L, according to the invention;

FIG. 1E is a side cross sectional view of a single chip portion of wafer A after Step 5 of the first SFB TMCPS manufacturing process, taken on a line 1K—1K through FIG. 1L, according to the invention;

FIG. 1F is a side cross sectional view of a single chip portion of wafer A assembled with wafer B after Step 5 of the first SFB TMCPS manufacturing process, taken on a line 1K—1K through FIG. 1L, according to the invention;

FIG. 1G is a side cross sectional view of a single chip portion of wafer A assembled with wafer B after Step 7 of the first SFB TMCPS manufacturing process, taken on a line 1K—1K through FIG. 1L, according to the invention;

FIG. 1H is a side cross sectional view of a single chip portion of wafer A assembled with wafer B after Step 8 of the first SFB TMCPS manufacturing process, taken on a line 1K—1K through FIG. 1L, according to the invention;

FIG. 1I is a side cross sectional view of a single chip portion of wafer A assembled with wafer B after Step 9 of the first SFB TMCPS manufacturing process, taken on a line 1K—1K through FIG. 1L, according to the invention;

FIG. 1J is a side cross sectional view of a single chip portion of wafer A assembled with wafer B after Step 10 of the first SFB TMCPS manufacturing process, taken on a line 1K—1K through FIG. 1L, according to the invention;

FIG. 1K is a side cross sectional view of a single chip portion of wafer A assembled with wafer B after Step 11 of the first SFB TMCPS manufacturing process, taken on a line 1K—1K through FIG. 1L, according to the invention;

FIG. 1L is a partially cut-away three dimensional view of a finished SFB TMCPS at the completion of the first SFB TMCPS manufacturing process, according to the invention;

FIG. 2A is a side cross sectional view of a single chip portion of wafer A after Step 2 of the second SFB TMCPS manufacturing process, taken on a line 2F—2F through FIG. 2G, according to the invention;

FIG. 2B is a side cross sectional view of a single chip portion of wafer A after Step 3 of the second SFB TMCPS manufacturing process, taken on a line 2F—2F through FIG. 2G, according to the invention;

FIG. 2C is a side cross sectional view of a single chip portion of wafer A assembled with wafer B after Step 4 of the second SFB TMCPS manufacturing process, taken on a line 2F—2F through FIG. 2G, according to the invention;

FIG. 2D is a side cross sectional view of a single chip portion of wafer A assembled with wafer B after Step 5 of the second SFB TMCPS manufacturing process, taken on a line 2F—2F through FIG. 2G, according to the invention;

FIG. 2E is a side cross sectional view of a single chip portion of wafer A assembled with wafer B after Step 6 of the second SFB TMCPS manufacturing process, taken on a line 2F—2F through FIG. 2G, according to the invention;

FIG. 2F is a side cross sectional view of a single chip portion of wafer A assembled with wafer B after Step 7 of the second SFB TMCPS manufacturing process, taken on a line 2F—2F through FIG. 2G, according to the invention;

FIG. 2G is a top plan view of a finished SFB TMCPS at the completion of the second SFB TMCPS manufacturing process, according to the invention; and FIG. 3 is a side cross sectional view of an example of a chemical-mechanical polishing (CMP) process, according to the invention.

DETAILED DESCRIPTION OF THE INVENTION

A silicon capacitive pressure sensor according to the present invention has the advantages of good stability over time, low power consumption, robust structure, large over pressure tolerance, large range, increased linearity and sensitivity, and improved temperature characteristics allowing simplified reading circuitry. The disclosed fabrication methods allow for reduced manufacturing costs due to reduced process time, simplified process steps, and improved process yield.

The present invention is directed to the design, fabrication and packaging of silicon capacitive pressure sensors for industrial and other applications where time stable operation over wide measurement ranges in difficult environments is required. The present sensor preferably operates in the touch mode with a zero suppression feature. However, non-touch mode operation is also usable. The present design approaches and manufacturing techniques result in unique performance.

While the present invention is particularly directed to the art of touch mode capacitive absolute pressure sensors, and will thus be described with specific reference thereto, it will be appreciated that the invention may have usefulness in other fields and applications such as for acceleration and force sensors, and for diaphragm type actuators.

The structure, operation, and advantages of the present preferred embodiments of the invention will become further apparent upon consideration of the following description taken in conjunction with the accompanying drawings.

FIG. 1L illustrates most of the elements of a first preferred embodiment of an all-silicon touch mode capacitive pressure sensor (TMCPS) 100 based on silicon fusion bond (SFB) technology. It consists of a conductive, deformable single crystal silicon diaphragm 152 with thickness "h" forming the top capacitive element (moving electrode) for both a sensing capacitor 140 and an optional reference capacitor 141. The diaphragm 152 is silicon fusion bonded to the surface of a second single crystal silicon wafer 102 (wafer A), via an intermediary oxide layer 104a". the wafer A (102) has several features including a sensing cavity 108 and a contact cavity 110, both of depth "g" below the wafer 102 surface. Connecting the sensing cavity 108 and the contact cavity 110 is a groove 106 of a lesser depth "d". Optional features, shown in FIG. 1L, are a reference capacitor groove 107a, a reference capacitor contact groove 107c, and a reference capacitor feedthrough groove 107b which connects the reference capacitor groove 107a to the reference capacitor contact groove 107c. These three optional grooves 107 (107a, 107b and 107c) are all at a depth "d1" which is less than or approximately the same as the depth "d" of groove 106. The shaded areas in the bottom of the cavities and grooves represent areas 112, 113 of the silicon substrate which have been rendered conductive to form a sensing capacitor fixed electrode 112a, a fixed electrode contact 112c, and a "buried feedthrough" 112b which electrically connects the fixed electrode 112a and its external contact 112c. The conductive area 113 is optional if a reference capacitor is desired, and consists of a reference capacitor bottom electrode 113a, a reference capacitor bottom electrode contact 113c, and a feedthrough 113b which electrically connects the reference capacitor bottom electrode 113a, to its external contact 113c. Three metal electrical contact pads are shown deposited on top of their corresponding contacts: the fixed electrode contact pad 130 (above contact 112c), the optional reference capacitor contact pad 131 (above optional contact 113c), and the top electrode contact pad 132 (providing a metal connection pad for the conductive silicon layer 152 which comprises the sensing capacitor's diaphragm/top electrode and also the optional reference capacitor's top electrode). Not shown in FIG. 1L are insulating layers which are formed on top of the bottom electrodes 112a (and optionally 112c), and partially filling the groove(s) 106 (and optionally 107b) on top of the feedthrough(s) 112b (and optionally 113b).

CHEMICAL MECHANICAL POLISHING

As mentioned hereinabove, the diaphragm 152, made from a single crystal silicon wafer 150 ("wafer B"), is bonded to another single crystal silicon wafer 102 ("wafer A") using silicon fusion bonding (SFB). Although SFB is a well-established bonding technique, its applicability has been limited in the prior art to bonding silicon and/or oxidized silicon surfaces which must be microscopically smooth in order to achieve a strong, durable, hermetically-sealed bond. This smoothness requirement is routinely met for the top surface of wafers such as wafer A (102), whether it is doped as N or P-type silicon, and with or without an insulating oxide layer such as layer 104a". The problem in the prior art has occurred when the silicon surface to be bonded needs to ba a heavily doped P+ layer such as the diaphragm 152. Heavily boron doped silicon (P+) is commonly used as an etch-stop layer to make microstructures, such as diaphragms and beams. The dimension of the structures made from the P+ layer can be precisely controlled, and the P+ layer is suitably conductive to allow the diaphragm 152 to be a capacitor electrode without metalizing. However, silicon fusion bonding of P+ is difficult. A known, low cost P+ doping process is heavy boron doping by diffusion, but this diffusion process creates a rough surface on the silicon wafer, with a high density of pits and dislocation lines which make the surface unsuitable for SFB. The pits and lines greatly reduce the wafer-to-wafer contact area, hence reducing the silicon fusion bonding force. The conventional solution has been to do the desired P+ doping by the much more time-consuming, and therefore more expensive, process of ion bombardment.

An important feature of this invention is a step in the manufacturing method which utilizes chemical-mechanical polishing (CMP) on the rough surfaced side 152 of wafer B 150 after using diffusion doping to create the P+ diaphragm layer 152 in the wafer B (150). Although the CMP process is well known in the art, this invention has developed a novel application of CMP to make possible a cost-reduced process for joining P+ silicon wafer surfaces. For the application of this invention, the CMP process and equipment are illustrated in FIG. 3. The wafer 350 (compare 150) which is to be polished, is held from the top in a rotating polishing head 360, and pressed flat against the rotating polishing plate 362. The chemical-mechanical polishing medium is a slurry 370 which is supplied to the surface of the polishing plate 362 in a way which maintains a suitable layer of slurry 370 between the polishing plate 362 and wafer 350. A slurry 370 such as SC-1 by Cabot, with an aggregate particle size of 100 nm and primary particle size of 30 nm can be used. Since the sorry contains both abrasive particles and a chemical etchent, the wafer 350 is subjected to both mechanical wearing and chemical etching simultaneously during polishing. Protrusions of different heights on the surface of the silicon wafer 350 will experience different pressures and consequently different wearing and etching. The difference in the removal rate will lead to smoothing on the surface. In a typical trial of the invented process, after 3 minutes of such CMP polishing the polished surface of wafer 350 had a micro-smoothness compatible with the surface of a blank device-graded wafer. After CMP, cost-effective diffusion doped P+ silicon wafer surfaces such as 152 become bondable by standard SFB techniques.

The annealing process for silicon fusion bonding limits the selection of the bottom electrode(s) 112a (and optionally 113a) of the capacitive sensor 140 and the optional reference capacitor 141. The same is true for the other conductive areas: the feedthrough(s) 112b (and optionally 113b) and the contact(s) 112c (and optionally (113c). The conductive areas cannot use common metals, such as aluminum or platinum (as is commonly done in a silicon-glass structure) since the SFB annealing temperature is normally higher than the eutectic temperature of most metals with the silicon substrate material. Besides furnace contamination considerations, the metal can alloy with silicon at the SFB annealing temperatures to cause high resistivity, open circuits, and difficulty to wire bond in the sensor packaging. A boron heavily diffused layer (P+) on the N-type silicon substrate 102 is used for the conductive areas 112 (and optionally 113) of the substrate 102 as it will provide sufficiently low resistivity after the final SFB annealing process. An added advantage is that the P+ conductive areas can also be easily wire-bonded even without metalization.

THE BURIED FEEDTHROUGH

The "buried feedthrough" 112b is an important feature of this invention, and is best seen illustrated in cross section view in FIG. 1I. A touch mode capacitive pressure sensor needs an electrical connection 112b between the bottom electrode 112a in the cavity 108 and the contact 112c for connection to an external interface circuit (not shown). For the preferred embodiment 100 which can measure absolute pressure, the cavity 108 must be evacuated and hermetically sealed to the diaphragm 152. Even though the conductors 112 of this invention are formed by a heavily doped boron diffusion process, rather than metal deposition, because of doping concentration dependent oxidation there is usually a step generated in the doped feedthrough region if the feedthrough is on the silicon surface, even when the feedthrough is covered by an insulating layer of oxide 114 or 104a". This would cause difficulties for silicon fusion bonding and hermetic sealing. In the buried feedthrough design of this invention, the feedthrough 112b is P+ diffusion doped in the bottom of a shallow groove 106 of depth d' (e.g., approximately 2.1–3.1 $\mu$m) below the SFB (top) surface of the oxide layer 104a", and then covered in the groove 106 with an insulating layer of oxide 114b of thickness t2 (e.g., approximately 0.2–0.3 $\mu$m) which only partially fills the depth of the groove 106, leaving a groove gap 106'. A subsequent process step can be used to hermetically seal the vacuum cavity of the sensor by depositing a layer 120 of low temperature oxide (LTO) (e.g., 400 mTorr, 450° C.) if an absolute pressure TMCPS is desired. By omitting the LTO layer 120 (especially the sealing portion 120b), the groove gap 106' can be used as a channel for a second pressure in a differential pressure version of a TMCPS. It should be noted that, unlike the prior art, this buried feedthrough technique promotes good silicon fusion bonding without any wafer-to-wafer alignment requirements.

STRAY CAPACITANCE, FLOATING ELECTRODES, REFERENCE CAPACITORS

Two features of this invention ensue from sensor design and manufacturing methods which address the problems of stray capacitance in silicon fusion bonded touch mode capacitive pressure sensor (SFB TMCPS). These features are illustrated, for example, in FIG. 1L, and comprise a floating bottom electrode 112a and buried feedthrough 112b, and also the optional addition of a reference capacitor 141 on the same chip 100 as the sensing capacitor 140.

It has been observed in the art that one drawback of silicon fusion bonded capacitive pressure sensors is that they have large zero-pressure capacitance, which makes the sensed capacitance much less than the background capacitance and thus limits applications of some capacitive interface circuits. For example, a typical SFB TMCPS has a measuring sensitivity of 0.086 pF/psi in a linear region from 30–70 psi, but the zero-pressure capacitance can be as high as 7.3 pF. The large zero-pressure capacitance originates from the relatively large SFB bonding area and the insulating oxide layer 104a" with a large dielectric constant which lies between the diaphragm layer 152 and the substrate 102 to which it is bonded. The bonded area creates an extra capacitor (creating "stray capacitance") which lies indistinguishably in parallel with the sensing capacitor 140 but cannot be electrically accessed separately. At zero pressure, since the deflection of the diaphragm 152 is small, the gap distance between diaphragm 152 and the bottom electrode 112a is large. Therefore the capacitance of the air-gap capacitor contributes a small part to the overall capacitance at zero pressure so the zero pressure capacitance is mainly determined by the stray capacitance created by the bonding area. For a given set of material properties and thicknesses, the stray capacitance will be roughly proportional to the size of the bonded area between the diaphragm 152 and the oxide layer 104a". Attempts to minimize this bonding area must be balanced against a bonding area size big enough to ensure a hermetic seal and good mechanical support of the diaphragm 152.

Besides minimizing the bonding area, another way to reduce stray capacitance in an SFB TMCPS is to reduce the conductivity of the substrate 102 and to electrically isolate ("float") the bottom electrode 112a. As a feature of the first preferred embodiment of this invention, represented by FIG. 1L, this is accomplished by using N-type silicon for the substrate 102 wafer A, and by creating a floating bottom electrode 112a through these of P+ doping for only the area of the electrode 112a and its electrical feedthrough 112b. Also, the sensing area (of the electrode 112a) is maximized relative to the total chip 100 area, and the non-sensing area of the feedthrough 112b (which contributes to the stray capacitance) is minimized by using a narrow groove 106, recessed below the surface with a partial air/vacuum gap (106' in FIG. 1I). Thus the floating electrode 112a design with buried feedthrough 112b is an advantageous feature of this invention which reduces stray capacitance effects.

Another approach to dealing with stray capacitance involves the use of reference capacitors to attempt to null out the zero pressure capacitance. In much of the prior art, the reference capacitor has been included in the interface circuits, but this can require complex circuitry and even then may not assure that the reference capacitor in the interface circuit changes with ambient conditions in the same way as the stray capacitance in the sensor. These problems are avoided when the reference capacitor is formed on the same silicon chip as the sensing capacitor and its accompanying stray capacitance. An advantageous feature of this invention is sensor designs which enable the implementation of a reference capacitor (e.g., 141, 241) on the same silicon chip (e.g., 100, 200) as the sensing capacitor (e.g., 140, 240).

Interface circuits, such as the CP10, CP11 and CP12 (portions of which are disclosed in THE commonly owned co-pending PCT patent application entitled DUAL CAPACITIVE INTERFACE CIRCUIT (Attorney's Docket No. DN1999-136), which are CMOS switched-capacitor C-V and C-F converters, can be used to overcome the obstacles presented by the large zero pressure or stray capacitance. Such converters have the ability to null out the zero pressure capacitance and to adjust the sensitivity and offset independently. The outputs of both converters are proportional to the charge difference between the measuring capacitor and a reference capacitor, which can be expressed as:

$$V = \frac{V_g C_x - V_o C_o}{C_f} \quad (1)$$

and $$F = k(V_g C_x - V_o C_o) \quad (2)$$

where V is an interface circuit's DC output voltage, F is an interface circuit's output frequency, $C_x$ and $C_o$ are the sensed capacitance and the reference capacitance, respectively, $V_g$ and $V_o$ are two DC voltages that can be used to control the gain, and $C_f$ is a constant capacitance, which can be used to adjust the circuit's sensitivity. It can be seen from equation (1) that if a smaller $C_f$ is used, then a larger voltage sensitivity can be obtained. The reference capacitor built into the sensor structure can be used as the $C_o$ in the interface circuit. Since it is fabricated and operated under the same conditions as the sensing capacitor $C_x$, the built-in reference capacitor has the same temperature characteristics as the sensing capacitor. This property is beneficial for the temperature stability of the sensor when it is used with a converter such as the CP-10, CP-11, or CP-12. In a test with a sensor 200 (see FIG. 2G) made according to this invention using the built-in reference $C_o$ (capacitor 241) instead of an external $C_o$, the sensitivity in the linear touch mode operation range is 40 mV/psi where the gain setting capacitor $C_f$ in a CP-10 interface is 10 pF. The temperature performance was improved to a relative error of ±0.66% in the temperature range from 27° C. to 100° C., compared to ±4.1% for a similar sensor using an external reference $C_o$ capacitor (and without a built-in reference capacitor 241).

A PREFERRED EMBODIMENT OF A SFB TMCPS MANUFACTURING PROCESS

Referring to the drawings, FIGS. 1A to 1K illustrate representative steps of a first preferred embodiment 100 of a structure and manufacturing process design for a touch mode capacitive pressure sensor (TMCPS) based on silicon fusion bonding (SFB) technology. The resulting sensor 100 embodiment can be seen in FIG. 1L, shown in a partially cutaway 3D view. Although these figures illustrate a single sensor at various stages in the process, it should be understood that these process steps are applied simultaneously to all the plurality of sensors, not shown, but contained within the bounds of the same wafer assembly which contains the illustrated sensor.

A first exemplary SFB TMCPS fabrication process, for fabricating a plurality of SFB TMCPS sensors according to the invention, includes the following process steps. Although the steps are numbered for convenient reference, it is within the scope of this invention to fabricate a sensor using some or all of these steps, and in any order. It should also be understood that the labeling of the steps is arbitrary, for the convenience of this explanation, so that a given "step" may actually include several discrete manufacturing processes or process stages.

Step 0. Begin with two single crystal silicon wafers: Wafer A (102) and Wafer B (150). Wafer A (102) is, for example, an N-type silicon wafer, <100> orientation, with a resistivity of 5–10 ohm-cm. Wafer A (102) is used as the substrate for the sensor 100 and includes a cavity for the bottom (fixed) electrode 112*a* of each sensor 100, plus various other features as will become evident from the following description. Wafer B (150) is, for example, a P-type silicon wafer, <100> orientation, with a resistivity of 2–5 ohm-cm. Wafer B (150) is used to form the diaphragm capacitive element (electrode) 152 of each sensor 100.

Step 1. FIG. 1A illustrates Wafer A (102) with a thin (e.g., approximately 5000 Å) layer of oxide 104 (104*a*, 104*b*) thermally grown on both flat sides (to prevent wafer buckling), to be used as an etching mask.

Step 2. FIG. 1B illustrates a feedthrough groove 106 which has been etched into Wafer A (102) for the electrical feedthrough 112*b* from the fixed electrode 112*a* in the cavity 108 to the electrical contact 112*c* outside of the cavity 108. Using "Mask 1", the oxide 104*a* is patterned (using known techniques) followed by a silicon etch (e.g., using SF6-based plasma silicon etching) to form a feedthrough groove 106 of initial depth "d" which is, for example, approximately 0.1 μm deep in the silicon below the oxide layer.

If the sensor 100 is to have an optional reference capacitor 141 (see FIG. 1L), then this Step 2 would also include etching grooves 107 (107*a*, 107*b*, 107*c*) for the reference capacitor groove 107*a*, the reference capacitor feedthrough groove 107*b*, and the reference capacitor contact groove 107*c*. If "Mask 1" is made to include the grooves 107 along with the groove 106, then all of these grooves 106, 107 could be patterned and etched simultaneously, and the grooves 107 would be at a depth below the silicon 102 surface measuring "d1" which is approximately the same as depth "d" of the feedthrough groove 106. In an alternate embodiment, a separate "Mask 1*a*" could be used for the grooves 107 after the pattern & etch is completed for "Mask 1". In this embodiment, the "Mask 1*a*" would be used to pattern the oxide layer 104*a* followed by a shorter-time silicon etch, or even no etch, in order to produce grooves 107 which are at a depth "d1" which is less than groove 106 depth "d", and could even be at zero depth, i.e. exposing the surface of the silicon 102 below the patterned grooves in the oxide layer 104*a*.

Step 3. FIG. 1C illustrates a sensing cavity 108 and a contact cavity 110 which have been etched so that they connect via the feedthrough groove. Using "Mask 2", the oxide is patterned followed by a silicon etch. The depth of the silicon etch is controlled to achieve an initial sensing cavity depth "g" which will ultimately (see Step 4) determine the desired sensing capacitor gap "g'" (electrode separation distance, e.g., 6 μm). Optionally, over-etch to create a step or, alternatively, a rounded-off edge around the periphery of the cavity 108. Finally, remove the oxide 104a and thermally grow another thin (e.g., approximately 5000 Å) oxide layer 104a' for use as a diffusion mask.

Step 4. FIG. 1D illustrates the connected conductive P+ areas 112 (112a, 112b, 112c) formed in the silicon at the bottom of the sensing cavity 108, the feedthrough groove 106, and the contact cavity 110, respectively. It should be noted that the P+ conductive area 112b includes portions which are formed in the vertical walls of the sensing cavity 108 and the contact cavity 110 in order to connect area 112a to area 112b to area 112c (also see FIG. 1L). Using "Mask 3", first pattern the oxide layer 104a', and then heavily-dope (P+) the exposed silicon by boron diffusion (e.g., using solid source BN at approximately 1120° C. for one hour) to form the conductive areas 112. In order to get good step coverage over the sensing cavity 108 of a few microns deep, a thick photoresist may be used.

If the sensor 100 is to have an optional reference capacitor 141 (see FIG. 1L) then this Step 4 would also include forming the conductive P+ areas 113 (113a, 113b, 113c) in the silicon at the bottom of the reference capacitor groove 107a, the reference capacitor feedthrough groove 107b and the reference capacitor contact groove 107c, respectively. If "Mask 3" is made to include the areas 113 along with the areas 112, then all of these areas 112, 113 could be patterned and P+ doped simultaneously.

After P+ doping, remove the boron glass which grows during the boron diffusion process (e.g., heat treat in an oxygen atmosphere to soften the borosilicate glass so that it can be removed by etching in BHF), and then strip off the now-contaminated oxide layer 104a'.

Step 5. FIG. 1E illustrates the formation of new insulating oxide layers 104a", 114a, 114b, and 114c over the wafer A (102) top surface, the bottom (fixed) electrode 112a, the buried feedthrough 112b, and the fixed electrode contact 112c, respectively. It should be noted that any of these new "oxide" layers could optionally be nitride or a combination of silicon oxide and silicon nitride in keeping with common practice to reduce stress. Using suitable masks (Masks 4a, 4b, etc. as needed) and known techniques (e.g., wet oxidation at 950° C.) grow a thick insulating oxide layer 104a" (e.g., thickness "t3" of 2–3 $\mu$m) on the top surface of wafer A (102). Similarly grow a thin insulating oxide layer 114b (e.g., thickness "t2" of 0.2–0.3 $\mu$m) over the buried feedthrough 112b. And similarly grow an insulating oxide layer 114a (e.g. thickness "t1" of 0.2–0.6 $\mu$m) over the fixed electrode 112a. It should be noted that these thicknesses are important and should be calculated to meet the design criteria for the specific TMCPS being manufactured. There is also an oxide layer 114c grown over the fixed electrode contact 112c. The thickness of this layer is not important as it will be stripped off again in a later step. It can be any convenient thickness, such as 0.1–3.0 $\mu$m.

The oxide layer 114a is the dielectric layer between the sensing capacitor's electrodes 112a and 152, and therefore partly determines the capacitance value. The depth "g'" measured from the top of layer 104a" down to the top of the layer 114a is determined by a combination of the initial sensing cavity depth "g" (see FIG. 1C) and the layer thicknesses "t1" and "t3". The depth "g'" becomes the effective sensing capacitor gap, which is an important TMCPS design parameter determining the TMCPS performance characteristics. The gap is easily adjusted, independently of other sensor characteristics, for different sensor designs by changing the silicon etching time in Step 3 to vary the initial sensing cavity depth "g".

Besides affecting the gap "g'", the oxide layer 104a" primarily determines the degree of insulation between wafer A (102) and the P+ conductive diaphragm 152. It also plays a role in determining stray capacitance, as described hereinabove.

Similar to the cavity depth "g'", the groove depth "d'" is determined by a combination of the initial groove depth "d" (see FIG. 1B) and the layer thicknesses "t2" and "t3". The depth "d'" should be adjusted to make a suitably sized channel into the sensing cavity 108 if the sensor 100 is to be used as a differential pressure transducer. On the other hand, the depth "d'" should be adjusted to leave a more shallow gap so that it can be more readily sealed off (see FIG. 1I) if the sensor 100 is to be used in its preferred application as an absolute pressure sensor.

If the sensor 100 is to have an optional reference capacitor 141 (see FIG. 1L), then this Step 5 would also include forming a new insulating oxide layer (not shown) over the reference capacitor's conductive areas 113 in the grooves 107. Since the reference capacitor's conductive areas 113 may even be on the surface of the wafer A (102), and do not require any gap, it may be suitable to simply cover the areas 113 with the same oxide layer 104a" of thickness "t3" which covers the rest of the top surface of wafer A (102).

After the oxide layers 104a", 114 have been grown, any protrusions on the edges of the cavities due to sharp corner oxidation can be removed using a mask ("Mask 5") having a combination of the patterns on "Mask 1" and "Mask 2", but with larger dimensions.

Step 6. FIG. 1F illustrates the result of treatments to Wafer B (150) which is then bonded to wafer A (102). First, wafer B (150) is heavily boron doped to form a P+ silicon diaphragm layer 152. As explained hereinabove, the manufacturing method of this invention allows the use of the less-costly diffusion doping process (e.g., diffusion using solid source BN for 8 hours at approximately 1120° C., followed by an extra hour with 1.5 SLPM oxygen to soften the borosilicate glass so that it can be removed by etching in BHF for about 30 minutes). Note that the length of the time used for the diffusion doping must be controlled to achieve the desired thickness "h" of the diaphragm layer 152. This diaphragm thickness "h" is a critical parameter in the design of TMCPS and is an important determinant of TMCPS characteristics and performance. Also as explained hereinabove, an important part of this invention is the preparation of the diaphragm layer 152 by CMP in order to make its diffusion doped surface smooth enough for good silicon fusion bonding (SFB). After CMP, the wafer A (102) and wafer B (150) are cleaned (e.g., by RCA cleaning), then bonded using SFB, and annealed (e.g., at 1000° C. for 1 hour).

Step 7. FIG. 1G illustrates the result of removing all of wafer B (150) except for the diaphragm 152. The P+ etch-stop technique (e.g., dissolving the backside silicon in EDP at 115° C.) can be used to fabricate the diaphragm 152 with the designed thickness. Due to the etch-stop mechanism which greatly slows the etching rate upon reaching the P+ layer, the diaphragm 152 thickness can be easily controlled. This is the final determinant of the critical dimension of the diaphragm 152 thickness "h".

Step 8. FIG. 1H illustrates the opening of a window for access to the fixed electrode contact 112c. Using a "Mask 6", etch the diaphragm 152 away from where it covers the fixed electrode contact 112c. This can be done, for example, using an SF6-based plasma etch, with photo-resist as the etching mask ("Mask 6").

If the sensor 100 is to have an optional reference capacitor 141 (see FIG. 1L), then this Step 8 would also include opening a window for the reference capacitor contact 113c.

If "Mask 6" is made to include the area 113c along with the area 112c, then both of these areas 112c, 113c could be patterned and etched simultaneously.

Step 9. FIG. 1I illustrates sealing the gap in the feedthrough groove 106'. This is an optional step, depending on whether a differential or absolute pressure sensor is desired. The groove gap 106' should be sealed only for an absolute pressure sensor, as discussed hereinabove. The groove gap 106' can be sealed by depositing a thin layer 120 (e.g., 1.0 $\mu$m) of low temperature oxide (LTO) over the entire top surface of the sensor 100, including the areas 120a above the diaphragm 152, the area 120b which covers the sides of the contact cavity 110 and thus seals the opening of the groove gap 106', and the area 120c which covers the fixed electrode contact 112c. Note that this step must be conducted in a vacuum in order to achieve a vacuum in the sensing capacitor cavity 108.

If there is an optional reference capacitor 141 (see FIG. 1L) present in the sensor 100, then the reference capacitor constant 113c which was exposed in the previous step would also be covered by a portion (not shown) of the LTO layer 120.

Step 10. FIG. 1J illustrates opening new windows 121 through the LTO layer 120 (using, for example, a "Mask 7" and dipping the wafer assembly 100 in BHF to remove the LTO). A fixed electrode contact window 121c is opened above the fixed electrode contact 112c. A diaphragm window 121a is also opened above the portion of the diaphragm 152a above 152a above the sensing capacitor cavity 108, so that the flexing part of the diaphragm 152 is pure silicon of the designed thickness "h". It may be desirable to make the diaphragm window slightly larger than the area of the sensing capacitor cavity 108. Referring to FIG. 1L, it can be seen that a diaphragm contact window 121d must be opened above a region of the diaphgram 152c where a diaphragm contact pad 132 can be placed.

If there is an optional reference capacitor 141 (see FIG. 1L) present in the sensor 100, then a reference capacitor contact window (not shown) will need to be opened above the reference capacitor contact 113c. If "Mask 7" is made to include the area above the reference capacitor contact 113c along with the areas for the other windows 121, then all of the windows could be opened simultaneously.

Step 11. FIGS. 1K and 1L show the result of metalizing to creat contact pads 130, 132, and optional 131 for better ohmic contact with the P+ conductive contact areas, which are, respectively, the fixed electrode contact 112c, the diaphragm contact 152c, and the optional reference capacitor contact 113c. The contact pads 130, 132, and optionally 131, are formed by metallization with a sputter and pattern technique, using "Mask 8". The metal layer is, for example, approximately 7500 Å of Al/Si/Cu.

Step 12. FIG. 1L is a partly cut away illustration of a completed SFB TMCPS sensor 100. In this final step, the wafer assembly (wafer A (102) plus wafer B (150)) is diced and then the resulting plurality of sensors 100 formed on the wafer assembly can be tested and packaged.

In this manner, capacitive pressure sensors can be fabricated which exhibit sensitivities of approximately 0.1 to 0.35 pF/psi in the linear TMCPS operating range.

SECOND PREFERRED EMBODIMENT—SIMPLIFIED MANUFACTURING METHOD

The process discussed hereinabove for the first preferred embodiment of the TMCPS 100 of this invention can be simplified to a three-layer process. Referring to the drawings, FIGS. 2A to 2F illustrate representative steps of a second preferred embodiment of a structure and manufacturing process design for a touch mode capacitive pressure sensor (TMCPS) 200 based on silicon fusion bonding (SFB) technology. The resulting sensor 200 embodiment can be seen in FIG. 2G, shown in a top view.

Throughout the following description of this embodiment of a sensor 200, a reference capacitor 241 will be included in the construction details. It should be understood that this reference capacitor 241 is an optional part of the overall sensor 200, and it is within the scope of this invention to manufacture a sensor 200 without a reference capacitor 241 by eliminating those parts of the herein described manufacturing process which are related to the reference capacitor 241 and its various components.

The following description also assumes that the preferred embodiment is a vacuum-reference, absolute pressure sensor. It should be apparent to those skilled in the art that this design could be changed to a differential pressure sensor by adding process steps which would vent the sensing cavity 208 to a second port. This could be done, for example, by etching a hole through the backside insulation layer 204b, wafer silicon 202 and insulator 214 into an edge of the sensing cavity 208 at a periphery of the insulator 214 where the diaphragm 252a would not be touching.

In general, this second preferred embodiment of a SFB TMCPS 200 has been simplified in a way which reduces manufacturing costs even further than the process described hereinabove for the first preferred embodiment 100, but still maintains excellent sensor performance. Although this second embodiment sensor 200 does not use a floating bottom electrode, it will be seen that various techniques have been utilized to minimize and counteract the attendant stray capacitance effects, especially through use of a minimum-sized diaphragm 252a over a proportionally maximized size sensing cavity 208, and also through use of an optional but preferred reference capacitor 241 built-in to the same chip as the sensing capacitor 240. In order to simplify the construction to this sensor 200, the substrate, Wafer A (202), as a whole is used as the bottom electrode(s) for the sensing capacitor 240 and the optional reference capacitor 241. The gap "g" is defined by the thickness "t3" of a thermally grown oxide layer 204a. Since there is no electrode feedthrough required, the hermetically sealed sensing cavity 208 can be formed by silicon fusion bonding without introducing extra processes other than the CMP process for the diaphragm layer 252 as described hereinabove for the first embodiment 100. There are preferably two capacitors 240, 241 constructed on the sensor chip 200. One (240) is constructed with a P+ silicon diaphragm 252a and the substrate 202 separated by a sensing cavity 208 and insulator 214, plus the surrounding bonding area 260. This capacitor 240 is pressure sensitive and preferably designed to operate mostly in the linear touch mode. The other capacitor 241 is constructed with a P+ silicon diaphragm 252d and the substrate 202 separated by the oxide layer 204a in the remainder 261 of the diaphragm layer 252 bonding area. It is insensitive to pressure and can be used as a reference capacitor 241. The completed sensor chip 200 is, for example, approximately 1.0 mm×1.5 mm×0.4 mm in size. For this exemplary size of chip 200, the diaphragm 252a can range in size, for example, approximately 300–400 $\mu$m in diameter.

Although the FIGS. 2A to 2G illustrate a single sensor at various stages in the process, it should be understood that these process steps are applied simultaneously to all the plurality of sensors, not shown, but contained within the bounds of the same wafer assembly which contains the illustrated sensor.

A second exemplary SFB TMCPS fabrication process, for fabricating a plurality of SFB TMCPS sensors according to the invention, includes the following process steps. Although the steps are numbered for convenient reference, it is within the scope of this invention to fabricate a sensor using some or all of these steps, and in any order. It should also be understood that the labeling of the steps is arbitrary, for the convenience of this explanation, so that a given "step" may actually include several discrete manufacturing processes or process stages.

Step 0. Begin with two single crystal silicon wafers: Wafer A (202) which will be used for the substrate, and Wafer B (250) which will be used to form the diaphragm layer 252. Wafer A (202) is, for example, a P-type silicon wafer, <100> orientation, with a resistivity of 2–5 ohm-cm. Wafer B (250) is, for example, a P-type silicon wafer, <100> orientation, with a resistivity of 2–5 ohm-cm.

Step 1. Wafer A (202) is prepared with a thick (e.g., approximately 2.2 µm) layer of oxide 204 (204a, 204b as can be seen in the step 2 illustration of FIG. 2A) thermally grown on both flat sides. The thickness of the backside oxide layer 204b is not critical, but the thickness "t3" of the top oxide layer 204a determines the initial gap of the capacitive pressure sensor. The same thickness of oxide for the backside oxide layer 204b can be used not only as a wet silicon etch mask, but also compensates for the stress in the top oxide layer 204a so that the wafer can keep flat for the silicon fusion bonding process.

Step 2. FIG. 2A illustrates a sensing cavity 208 etched into the top oxide layer 204a. The cavity can be any shape, according to the TMCPS design, but is typically circular, square, or rectangular. In this example the cavity 208 is assumed to be round, as shown in FIG. 2G. To form the sensing cavity 208 the oxide layer 204a is etched completely through, stopping at the top surface of the silicon substrate 202, thereby creating a sensing cavity depth of "g" which is approximately the same as the top oxide layer 204a thickness "t3". The oxide in cavity area is etched using, for example, reactive ion etching (RIE), which can produce very vertical sidewalls after etching. The portion of the silicon substrate 202 which is exposed by the sensing cavity 208 becomes the fixed electrode 212 for the sensing capacitor 240.

Step 3. FIG. 2B illustrates a capacitor-quality insulator (dielectric) layer 214 grown, using known techniques (e.g., wet oxidation at 950° C.) on the bottom of the sensing cavity 208. The insulating layer 214 is grown to a thickness "t1" (e.g., 0.1 µm) according to the design of the sensor 200 and is critical to provide electrical isolation when the diaphragm 252a touches the bottom of the cavity 208 during touch mode operation of the TMCPS.

Step 4. FIG. 2C illustrates the bonded assembly of the two wafers, wafer A (202) and wafer B (250). Before bonding, the top wafer B (250) must be prepared as in the first embodiment described hereinabove: a well-defined thickness "h" of heavily doped boron (using a diffusion process) creates a P+ silicon layer 252; the now-roughened surface of the P+ layer 252 is suitably polished using chemical-mechanical polishing (CMP); and then wafer B (250) is bonded to the substrate wafer A (202) using the silicon fusion bonding (SFB) technique, with the P+ silicon diaphragm layer 252 bonded to the insulating oxide layer 204a. No alignment is required during the bonding. The bonding is performed in a vacuum in order to provide a vacuum reference in the resulting hermetically sealed sensing cavity 208.

Step 5. FIG. 2D illustrates the wafer assembly 200 after dissolving away the unwanted portion of wafer B (250). After bonding in the previous step, the wafer assembly 200 is immersed in a dopant-dependent etchant (such as EDP, KOH and TMAH) to dissolve the pure silicon portion of wafer B (250) until reaching the P+ silicon layer 252. Standard etch-stop techniques can be used to accurately control the dissolving time and thereby control the performance-critical dimension "h" which is the resulting thickness of the diaphragm layer 252.

Step 6. FIGS. 2E and 2G illustrate the important step of patterning and etching the diaphragm layer 252. This can be done, for example, using the SF6-based plasma etch, with photo-resist as the etching mask. The diaphragm layer 252 is etched completely through, stopping at the underlying oxide layer 204a to create a groove 255 around the cavity 208 and extending out to one side of the chip 200. The groove 255 defines the extent of the sensing diaphragm 252a (with a connecting path 252b to a diaphragm contact area 252c) and electrically isolates the areas 252a, 252b, and 252c from the remainder 252d of the diaphragm layer 252.

The dashed line marks the periphery 209 of the sensing cavity 208 hidden under the sensing diaphragm 252a, so it can be seen that the area 260 between the groove 255 and the sensing cavity periphery 209 becomes the bonding area for the sensing diaphragm 252a. This diaphragm bonding area 260 must be minimized (along with the connected areas 252b and 252c) in order to minimize stray capacitance, but the minimum bonding area must be determined by good design practices to provide adequate strength for that bend which is continually stressed by the flexing of the sensing diaphragm 252a in response to the pressure being sensed.

Using another mask, a fixed electrode contact cavity 210 is etched through an area of the top oxide layer 204a near the edge approximately as shown to expose the surface of the substrate 202.

Step 7. FIGS. 2F and 2G illustrate the addition of metalized contact pads 230, 231, 232 for connecting the sensor 200 to an interface circuit. This can be done, for example, by forming aluminum contact pads using a lift-off technique. Diaphragm contact pad 232 applied to the diaphragm contact area 252c provides an electrical connection point for the sensing diaphragm 252a (the moving electrode of the sensing capacitor 240). Reference capacitor contact pad 231 provides an electrical connection point for the top electrode 252d of the reference capacitor 241, and substrate contact pad 230, applied to the surface of the substrate 202 which is exposed in the bottom of the fixed electrode contact cavity 210, provides an electrical connection point for the bottom (fixed) electrode of both the sensing capacitor 240 and the reference capacitor 241.

Step 8. FIG. 2G is a top view illustration of a completed SFB TMCPS sensor 200. In this final step, the wafer assembly (wafer A (202) plus wafer B (250)) is diced and then the resulting plurality of sensors 200 formed on the wafer assembly can be tested and packaged.

This simplified process of the second preferred embodiment utilizes single-side processing of silicon wafers. It only requires three non-critical masking steps and can produce very high yield.

In the preferred embodiments of manufacturing processes described hereinabove, it should be apparent to those skilled in the art that the manufacturing processes described are not specific to any particular shape or size of sensing cavities (e.g., 108, 208). The sensing cavities could be square, rectangular, or circular (as in most CPS designs), or they could even be any shape of enclosed area having a flat surface for bonding to the diaphragm. In like fashion, it should be apparent to those skilled in the art that the sensor manufacturing processes of this invention can be applied to capacitive pressure sensors and other diaphragm-containing devices whether or not they function as a touch mode capacitive pressure sensor.

Although the invention has been illustrated and described in detail in the drawings and foregoing description, the same is to be considered as illustrative and not restrictive in character, it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

What is claimed is:

1. A method of fabricating silicon capacitive sensors, characterized by the steps of:

providing a first silicon wafer and a second silicon wafer;

for each sensor, etching a groove in the first silicon wafer;

for each sensor, etching a sensing cavity and a contact cavity, each cavity connected to an opposing end of the groove in the first silicon wafer;

for each sensor, after etching the groove and the cavities, forming a continuous and connected conductive area in the bottoms of the groove and the cavities, in the first silicon wafer;

forming a P+ conductive diaphragm layer in the second silicon wafer by means of diffusion doping;

after the step of forming the diaphragm layer in the second silicon wafer, preparing the surface of the diaphragm layer for bonding by polishing with a chemical-mechanical polishing (CMP) process;

bonding the first silicon wafer and the second silicon wafer together using a silicon fusion bonding (SFB) technique;

dissolving the second silicon wafer, except for the diaphragm layer;

after the step of dissolving the second silicon wafer, for each sensor, etching open a fixed electrode contact window through the diaphragm layer to the contact cavity; and dicing a plurality of sensors formed from the first and second silicon wafers.

2. Method, according to claim 1, including the steps of:

providing the first silicon wafer as an N-type silicon wafer, <100> orientation, with resistivity of 5–10 ohm-cm; and providing the second silicon wafer as a P-type silicon wafer, <100> orientation, with resistivity of 2–5 ohm-cm.

3. Method, according to claim 1, including the steps of:

for each sensor, after forming a conductive area in the bottom of the sensing cavity, forming an oxide layer over the conductive area in the bottom of the sensing cavity, in the first silicon wafer; and after forming a conductive area in the bottom of the groove which connects to the sensing cavity conductive area, forming an oxide layer over the conductive area in the bottom of the groove (106) and extending into the sensing cavity, in the first silicon wafer.

4. Method, according to claim 1, including the steps of:

sealing the grooves by depositing a layer of LTO; and masking and etching the LTO layer to open windows through the LTO layer including a diaphragm window, a fixed electrode contact window, a diaphragm contact window, and a window above a reference capacitor contact, if present.

5. Method, according to claim 1, including the step of:

for each sensing capacitor in each sensor, fabricating an associated reference capacitor with a reference capacitor bottom electrode, a reference capacitor bottom electrode contact, a reference capacitor feedthrough which electrically connects the reference capacitor bottom electrode to the reference capacitor bottom electrode contact, a reference capacitor contact pad, a dielectric oxide layer, and a top electrode which is the diaphragm layer.

6. Method, according to claim 1, for each sensor, after the step of etching open a window through the diaphragm layer to the fixed electrode contact cavity, further including the steps of:

depositing metallization on the fixed electrode contact to form a sensing capacitor fixed electrode contact pad; and depositing metallization on the diaphragm layer to form a diaphragm contact pad.

7. Method, according to claim 1, including the step of:

during the step of etching the cavities, over-etch to create a step around the periphery of the cavities.

8. Method, according to claim 1, including the step of:

during the step of etching the cavities, round off edges of the cavities.

9. Method, according to claim 1, wherein the step of forming the conductive area for each sensor further includes the steps of:

applying and patterning a masking layer; and heavily diffusing boron (+).

10. Method, according to claim 1, further including the step of:

prior to silicon fusion bonding the wafers, preparing the wafers for silicon fusion bonding by RCA cleaning.

11. Method, according to claim 1, including the step of dissolving the second silicon wafer by:

dissolving in EDP.

12. A silicon capacitive sensor including a first silicon wafer and a second silicon wafer, characterized by:

a groove etched in the first silicon wafer;

a sensing cavity and a contact cavity etched in the first silicon wafer with each cavity connected to an opposing end of the groove;

a continuous and connected conductive area in the bottoms of the groove and the cavities, in the first silicon wafer;

a P+ conductive diaphragm layer formed in the second silicon wafer;

the first and second wafers being bonded together, with the second silicon wafer being dissolved except for the diaphragm layer; and a window through the diaphragm layer to the contact cavity.

13. A silicon capacitive sensor, according to claim 12, characterized in that:
   the first silicon wafer is an N-type silicon wafer with resistivity of 5–10 ohm-cm; and
   the second silicon wafer is a P-type silicon wafer with resistivity of 2–5 ohm-cm.

14. A silicon capacitive sensor, according to claim 12, characterized in that:
   an oxide layer is over the conductive area in the bottom of the sensing cavity; and
   an oxide layer is over the conductive area in the bottom of the groove and extends into the sensing cavity.

15. A silicon capacitive sensor, according to claim 12, characterized in that:
   the grooves are sealed by a deposited layer of LTO; and
   windows pass through the LTO layer to form a diaphragm window, a fixed electrode contact window, a diaphragm contact window, and a window above a reference capacitor contact.

16. A silicon capacitive sensor, according to claim 12, further characterized by:
   a sensing capacitor; and
   an associated reference capacitor with a reference capacitor bottom electrode, a reference capacitor bottom electrode contact, a reference capacitor feedthrough which electrically connects the reference capacitor bottom electrode to the reference capacitor bottom electrode contact, a reference capacitor contact pad, a dielectric oxide layer, and a top electrode being the diaphragm layer.

17. A silicon capacitive sensor, according to claim 12, characterized in that:
   deposited metallization on the fixed electrode contact forms a sensing capacitor fixed electrode contact pad; and
   deposited metallization on the diaphragm layer forms a diaphragm contact pad.

18. A method for forming an electrical feedthrough to a conductor in a cavity formed in a first silicon wafer, wherein the first silicon wafer is bonded to a second silicon wafer, characterized by the steps of:
   etching a groove in the first silicon wafer;
   etching the cavity and a contact cavity, each cavity connected to an opposing end of the groove in the first silicon wafer;
   forming a continuous and connected conductive area in the bottoms of the groove and the cavities, in the first silicon wafer;
   bonding the first and second wafers together using silicon fusion bonding (SFB);
   etching a window through the second wafer to the contact cavity on the first silicon wafer;
   forming an oxide layer over the conductive area in the bottom of the sensing cavity, in the first silicon wafer; and
   forming an oxide layer over the conductive area in the bottom of the groove and extending into the cavity, in the first silicon wafer.

19. A method for forming an electrical feedthrough to a conductor in a cavity formed in a first silicon wafer, wherein the first silicon wafer is bonded to a second silicon wafer, characterized by the steps of:
   etching a groove in the first silicon wafer;
   etching the cavity and a contact cavity, each cavity connected to an opposing end of the groove in the first silicon wafer;
   forming a continuous and connected conductive area in the bottoms of the groove and the cavities, in the first silicon wafer;
   bonding the first and second wafers together using silicon fusion bonding (SFB);
   etching a window through the second wafer to the contact cavity on the first silicon wafer
   sealing the groove by depositing LTO; and
   opening a window above a contact portion of the conductive area, by etching the LTO.

* * * * *